May 7, 1957

O. H. DORER 2,791,179

COMBINED FLOW CONTROL AND REPHASING
MECHANISM FOR FLUID PUMPING UNITS

Filed Sept. 29, 1953

OSCAR H. DORER
INVENTOR.

BY

May 7, 1957

O. H. DORER 2,791,179

COMBINED FLOW CONTROL AND REPHASING
MECHANISM FOR FLUID PUMPING UNITS

Filed Sept. 29, 1953

OSCAR H. DORER
*INVENTOR.*

BY
*atty*

OSCAR H. DORER
INVENTOR.
BY

May 7, 1957

O. H. DORER 2,791,179

COMBINED FLOW CONTROL AND REPHASING
MECHANISM FOR FLUID PUMPING UNITS

Filed Sept. 29, 1953

OSCAR H. DORER
*INVENTOR.*

BY [signature]
*atty*

United States Patent Office 2,791,179
Patented May 7, 1957

2,791,179

COMBINED FLOW CONTROL AND REPHASING MECHANISM FOR FLUID PUMPING UNITS

Oscar H. Dorer, East Orange, N. J., assignor to Worthington Corporation, Harrison, N. J., a corporation of Delaware Application September 29, 1953, Serial No. 382,953

19 Claims. (Cl. 103—11)

This invention relates generally to fluid pumping units or pumping stations utilized in installations where the quantity of fluid to be pumped varies widely from time to time, such as in sewage systems or combined sewage and storm sewer systems, etc., and more particularly to a combined variable flow control for pumps and rephasing mechanism automatically responsive to the rise and fall of the fluid level in the suction reservoir at a particular reference level, to control the speed of the pumping units; and adapted to change the reference level of the fluid in the suction reservoir as desired or required during operation of the fluid pumping units.

Pumping stations or systems to which the present invention is applicable include several pumps, each having means thereon to vary the fluid pumped between the minimum and maximum capacities of the pump, and depending of course on the total quantity of fluid to be pumped, one or more of these pumps must be placed in operation and made to function at an output capacity or capacities to produce the desired results. The means for varying the quantity of fluid pumped may, for example, change the length of the stroke of the pump or as is shown in the form of the pump used to illustrate the present invention, to vary the speed of operation of the pump.

However, whatever mechanism is provided it has been found that the activation of a particular pump as to output capacity, or of the number of pumps to be put into operation, can be favorably controlled by the rise and fall of a float riding the surface of the liquid at the suction supplied to the pump.

For example, in Patent No. 2,733,660, one such control system is illustrated and described for the variable speed operation of pumps by magnetic drive motors actuated in response to the rise and fall of a float riding the surface of the liquid in the suction reservoir for the pumps. The control system of this copending application, however, is designed within minor variations to maintain the level of the suction reservoir substantially constant. In this type of control the minimum and maximum speed of all the units becomes a function of the gradient of level at which the float is located and the total effect even with an over-travel adjustment is to produce undesirable on-and-off operation and high power consumption where there is a large quantity of fluid to be pumped by reason of the large net positive suction head.

It has been found that where flooding of the inlet conduit to the suction reservoir is to be prevented under heavy load conditions or where reduced net positive suction head will produce either reduced power consumption or allow the inflow conduit to act as a reservoir, that it is desirable to lower or raise the suction reservoir levels by a considerable amount as successive units are taken out of or placed into operation. However, it is also desirable to retain with this variation in the suction reservoir level the feature of balancing the discharge of the pumps against the inflow of the suction reservoir, or of controlling the flow capacities of the pumps by the rise and fall of the fluid level in the reservoir from these predetermined levels.

In order to increase or decrease the varying reference position of the fluid level in the suction reservoir as units are placed into or removed from operation, from a single operating float, and still maintain the variable speed feature, either the length of chain from the float to the mechanism controlling the speed should be shortened or the control mechanism rephased to accomplish the same purpose.

The present invention meets this problem by providing a pumping system which is automatically controlled to allow the level of the suction reservoir to remain either susbstantially constant, to be graduated upward or downwards as desired or dictated by local requirements, by rephasing the actuating cam controlling the means for varying the output flow of the pump, that is, displacing the cam to a new position from its previously set reference to float position so that when additional units are placed in operation pumps operate at reduced or increased flow depending upon whether the reference level of the fluid in the reservoir is to be raised or lowered and on the ratio of the inflow to the suction reservoir until the level reaches the new reference position at which the rise and fall of the fluid level in the reservoir once again acts to balance the inflow and outflow ratio until the next rephasing is found to be desirable or necessary.

It is another object of the present invention to provide a control adapted to automatically regulate within predetermined limits, or to automatically control, the fluid level in the suction reservoir of a pumping system by controlling the number of pumps in operation and their speed so as to equate the rate of discharge of said pump or pumps in said system against the inflow to the suction reservoir to produce the desired variations in speed or level changes.

It is still another object of the present invention to provide a control mechanism for fluid pumping systems having an overtravel control which permits considerable storage of incoming water and thus reduces to a minimum the on-and-off operation of the pumping units in the sysstem.

With this and other objects in view, as may appear from the accompanying specification, the invention consists of various features of construction and combination of parts, which will be first described in connection with the accompanying drawings, showing a combined flow control and rephasing mechanism for fluid pumping units of a preferred form embodying the invention, and the features forming the invention will be specifically pointed out in the claims.

Figure 1:
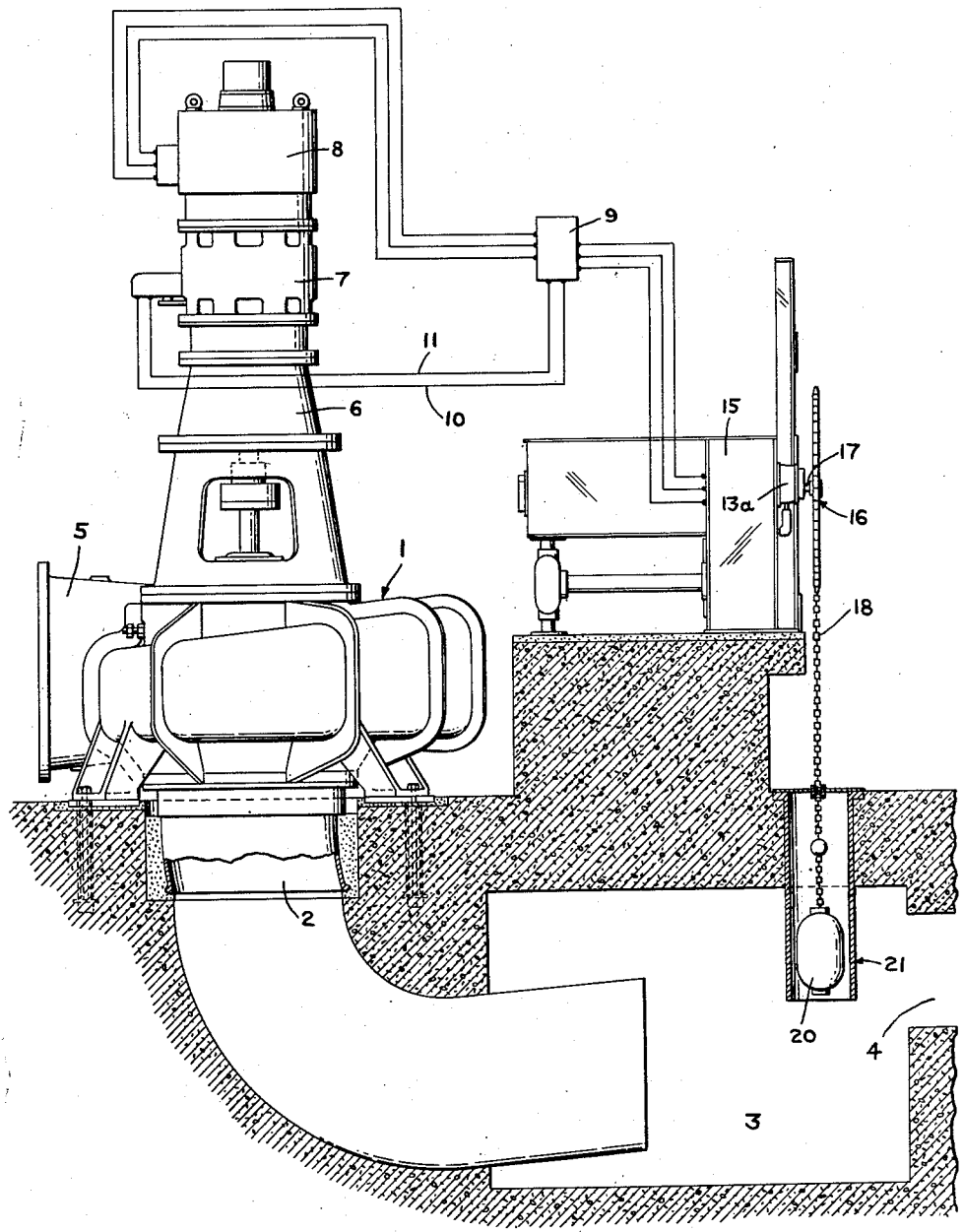
Figure 1 is a diagrammatic view of a pumping unit showing the present invention embodied therein.

Referring to the drawings, Figure 1 shows a pump unit 1 which may be of any approved type such as a centrifugal pump applicable for use in the pumping conditions to be met, it being understood that this unit is only representative and that generally there are at least two or more such units which may be individually controlled responsive to separate floats or as in the present arrangement of the invention all the pumps may be controlled by a single float.

Thus pump 1 has its suction inlet 2 connected to a suction reservoir 3 which contains fluid delivered therein from a source (not shown) through the inflow pipe 4. The pump discharges through its discharge outlet 5 to any suitable point of discharge.

The pump is connected through gearing generally designated 6 to a magnetic drive 7 which is in turn driven by a constant speed prime mover 8 such as a synchronous electric motor which provides high efficiencies, high power factors, and power factor corrections.

The magnetic drive 7 provides the means for adjusting the speed of the pump while allowing the prime mover 8 to operate at constant speed. This is accomplished by the amount of excitation to the magnets forming part of the drive. The excitation is supplied from a three-phase rectifier (not shown) incorporated in the magnetic drive control actuated responsive to an electronic control 9 connected thereto by lines 10 and 11 which in turn acts in accordance with the signals from a small potentiometer rheostat 13a.

Since there are other pump units and electronic controls in the pumping system identical with that above described, potentiometer rheostats 13b and 13c are deemed sufficient to indicate the relationship of the additional units to the present invention. The potentiometers 13a, 13b and 13c control the output of electronic tubes (not shown) in their respective electronic controls to produce the desired result, which electronic controls are well known in the art and hence not more fully described herein.

The relationship and operation of the electronic controls and the magnetic drive are described in my copending application abovementioned and in addition are known in the present art.

In operation, as the potentiometers are adjusted responsive to the rise and fall of the fluid level in the suction reservoir, as hereinafter described, the electronic controls will excite the magnetic drives directly proportional to the signals of the potentiometers. The speed of the pump varies from a predetermined minimum to a predetermined maximum which in turn varies the output capacity of the pump. This operation is, of course, not applicable during the period when the reference level of the suction reservoir is being varied to a new position, as hereinafter described.

Figure 2:
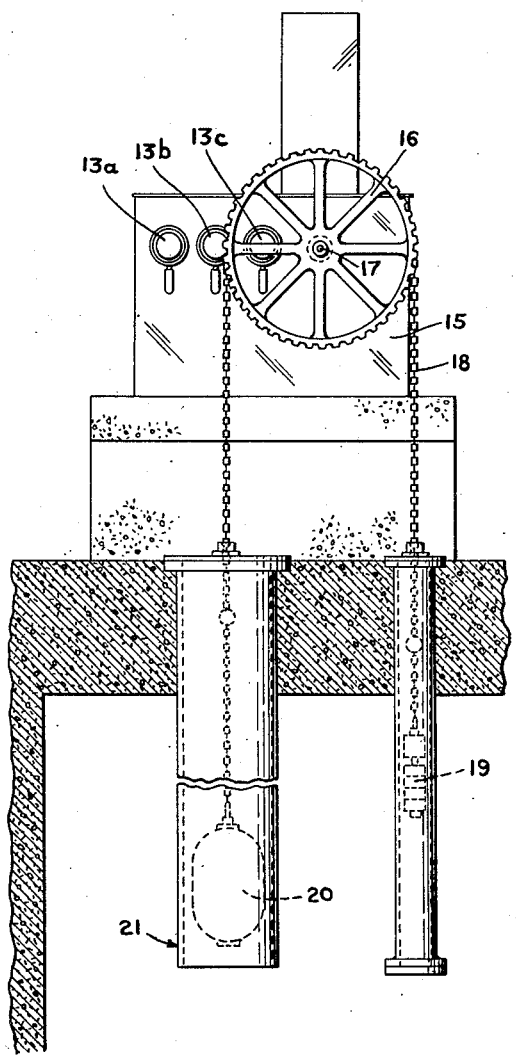
Figure 2 is a side elevation of the fluid level operated control mechanism.
Figure 3:
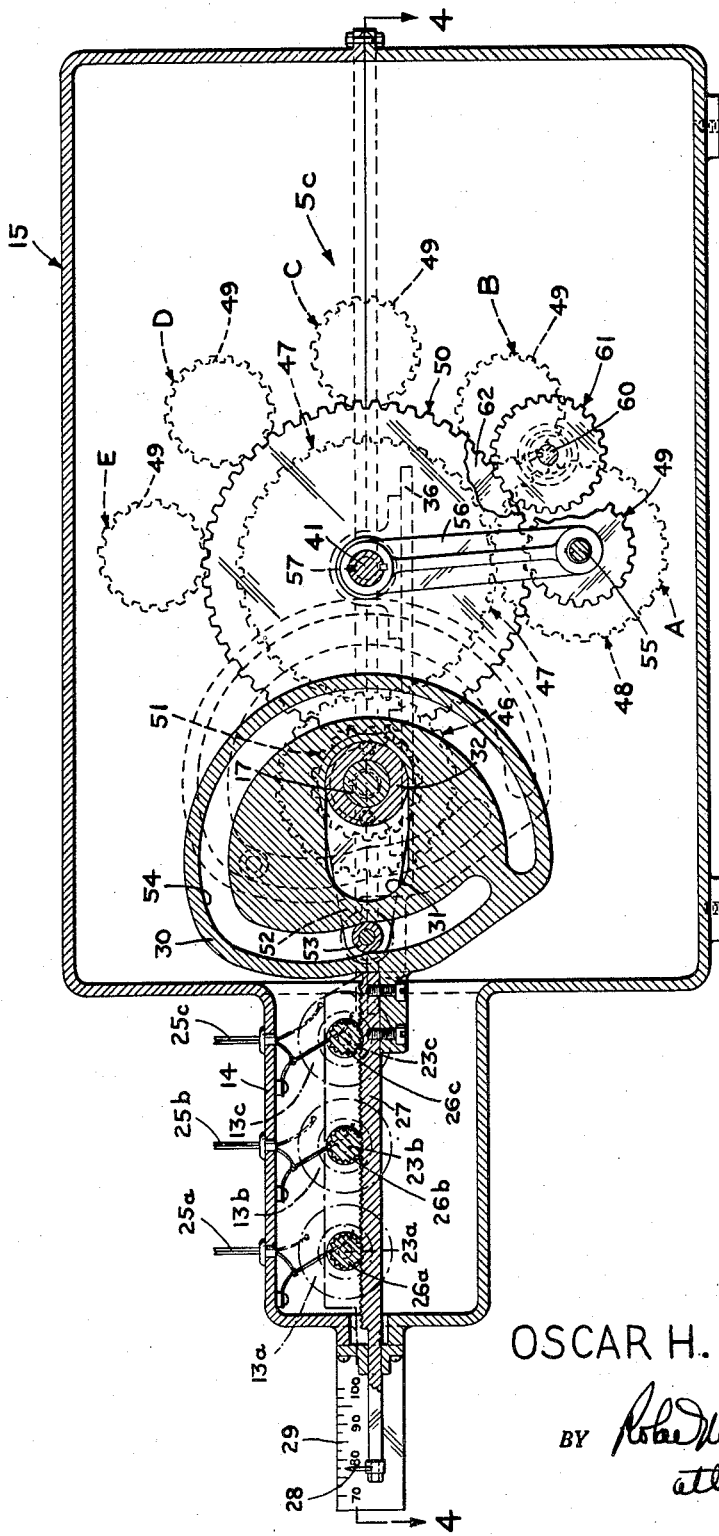
Figure 3 is a side view partly in section taken on line 3—3 of Figure 4 of the actuating cam and gearing arrangement of the fluid level operated control mechanism.

In Figures 2 and 3 the potentiometer rheostats 13a, 13b and 13c are shown as mounted in a laterally projected portion 14 of a substantially rectangular box-like housing 15 containing the flow control and rephasing mechanism generally designated FC. The speed control and rephasing mechanism provides means for varying the potentiometers in accordance with the rise and fall of the level of the fluid in the suction reservoir, and also modify and adjust the signals of the potentiometer so that the fluid level of the suction reservoir can be raised or lowered as desired or necessitated by the operating conditions.

The rise and fall of the fluid is conveyed to the flow control and rephasing mechanism FC through a sprocket 16 connected on one end of a main shaft 17. About the sprocket 16 is a chain or cable 18 which has a counter-weight 19 on one end and a float 20 on the other. The float 20 is disposed in a float tube 21 which extends down into the suction reservoir 3 so that the float will be shielded from disturbances or turbulence in the suction reservoir and register the mean level therein at all times.

As the level rises and falls in the reservoir by action and counteraction of the float 20 and the counter-weight 19, the sprocket 16 and hence the shaft 17 connected thereto will be rotated in one or the other direction.

Means for varying the potentiometers

The potentiometers 13a, 13b and 13c are shown as being mounted in the laterally projected portion of the housing in any suitable manner so that their respective dial indicators 22a, 22b and 22c are clearly visible from the outside of the housing. The potentiometers are provided with shafts 23a, 23b and 23c which are mounted transversely of the center line of the longest axis of the housing. Each shaft in turn is provided with potentiometer fingers 24a, 24b and 24c which when rotated by the shafts as hereinafter described engage rheostats (not shown) on the potentiometers, which rheostats are connected to the electronic tube in the electronic control by means of lines 25a, 25b and 25c.

Fixedly mounted on the medial portion of said shafts 23a, 23b and 23c are pinion elements 26a, 26b and 26c which are engaged and moved by an elongated rack element 27 disposed to be actuated in a plane substantially parallel to the center axis of the housing. A pointer 28 on the outer end of the rack element 27 will be positioned along a scale 29 to show the relative percentage of speed or capacity at which the pumps are operating. The rack element at the inner end thereof extends into the main portion of the housing and is fixedly connected to and movable with an irregular semicircular actuating cam 30, all of the above being clearly shown in Figures 2, 3, and 4 of the drawings.

Figure 4:
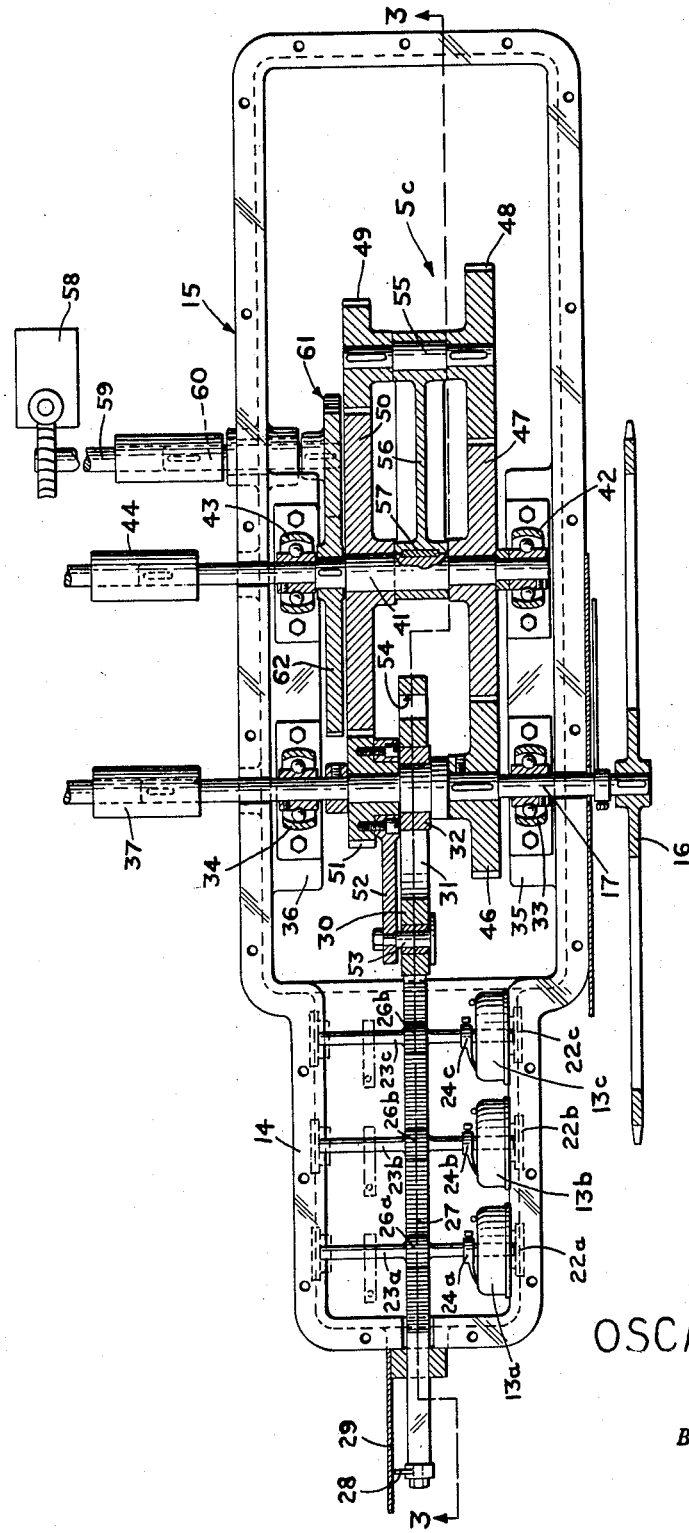
Figure 4 is a top view partly in section taken on the line 4—4 of Figure 3.

Referring to Figures 3 and 4, the actuating cam 30 is shown as slidably mounted by means of an oval slot 31 about a roller element 32 which is freely rotatable on the main shaft 17. When the actuating cam is moved as hereinafter described, it will slide on said roller element within the limits of the slot 31. These limits are slightly in excess of the predetermined minimum and maximum capacities of the respective pump units. Thus, the rack which is fixedly connected to the actuating cam 30 moves, which in turn causes the pinions 26a, 26b and 26c in engagement therewith to rotate the shafts 23a, 23b and 23c respectively, and hence the potentiometer finger elements 24a, 24b and 24c which in turn signal the electronic control for the desired excitation of the respective magnetic drives on the pump units to control desired output of the pumps.

Means for positioning the actuating cam

The actuating cam 30 is moved both responsive to the rise and fall of the fluid level in the suction reservoir at a particular reference position to regulate the potentiometer rheostat 13a, 13b and 13c and thus vary the output capacity of the pumps to equate the inflow and discharge rates to the suction reservoir; and to a rephasing mechanism, that is, means which repositions the cam to adjust the potentiometer rheostats 13a, 13b and 13c whereby the output of the pumps when another pump unit is added or removed will be such that the fluid level of the suction reservoir is allowed to change, through pump action, upwardly or downwardly to a new reference position of cam-to-fluid level at which the rise and fall of the fluid level will once again control the output capacity of the pumps then in operation at the new reference level.

Thus, in regular operation, when the rise and fall acts to balance or equate the inflow and pump-out rates of the suction reservoir, the rise and fall of the fluid level in the suction reservoir 3 is conveyed through the float 20 to the sprocket 16 and main shaft 17 so as to rotate the main shaft and sprocket in one or the other direction, as above described.

Figures 5, 6, 7, 8:
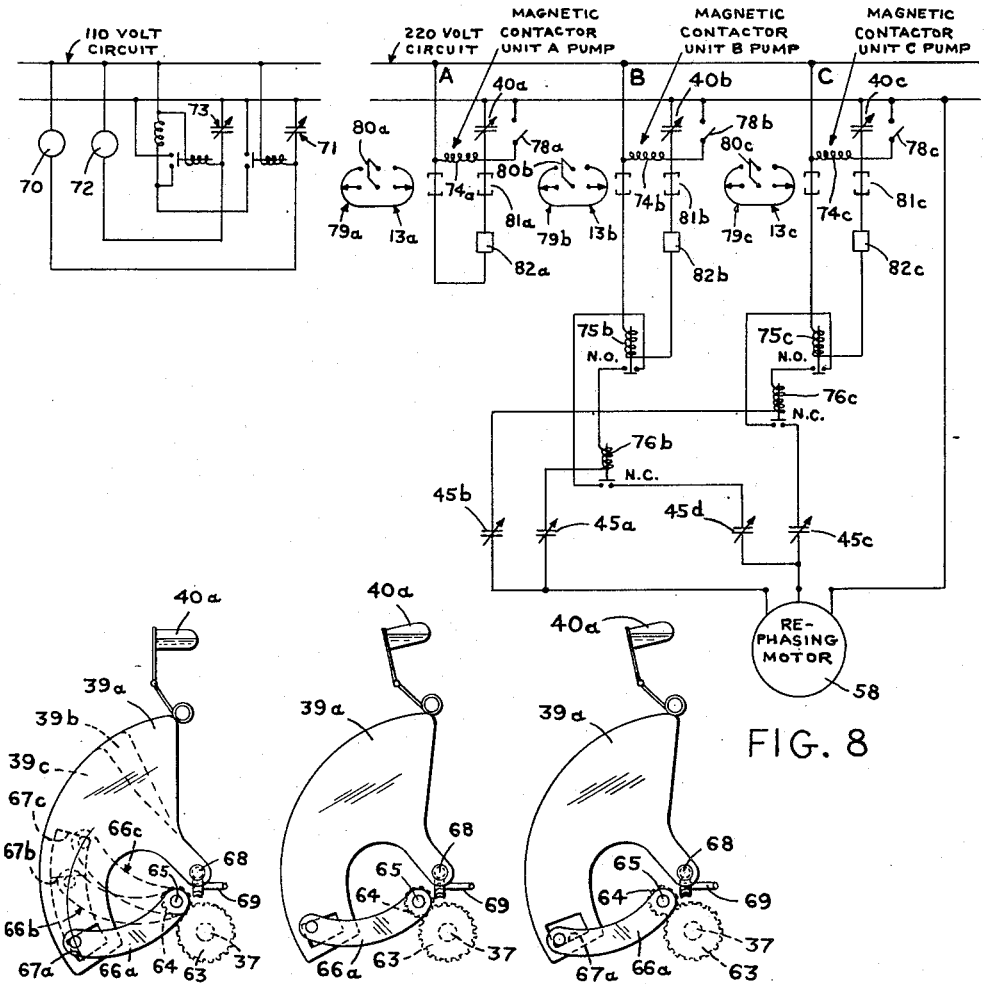
Figure 5 is a view of the cam switches for activating the rephasing motor.
Figure 6 is a view of one cam switch in the contacting position.
Figure 7 is a view of the same cam switch showing the backlash arm for the cam and the contacting position.
Figure 8 is a view of the electrical circuit for the illustrated pumping unit with the rephasing means thereon.

The main shaft 17 which carries the rollers 32 and actuating cam 30 is disposed transversely of the largest axis in the housing and is supported therein by ball or roller bearings 33 and 34 fixedly connected to brackets 35 and 36 formed in spaced relation on the inner walls of the housing 15. The shaft 17 extends out on both sides of the housing, and on one side is keyed to the sprocket member 16 while on the other side it is fixedly keyed to a cam switch shaft 37 in turn connected to the cam elements 39a, 39b and 39c which operate the pump switches 40a, 40b and 40c. The cam elements are shown in Figures 5, 6 and 7 of the drawings and the pump switches diagrammatically illustrated in the electrical circuit, Figure 8, for the pumping units.

Spaced from the main shaft 17 and also transversely disposed in said housing is a rephasing shaft 41 which is rotatably mounted in a second set of spaced ball bearings 42 and 43 fixedly connected to the brackets 35 and 36. The rephasing shaft extends outwardly of the housing where it is keyed to a breaking switch shaft 44, which carries breaking switches 45a, 45b, 45c, and 45d, shown in the electrical circuit in Figure 8, which breaking switches act to break the circuit to the rephasing motor.

The rotary movement conveyed to the main shaft 17 by the sprocket is conveyed through a gear train which includes gears 46, 47, 48, 49, 50 and 51 each having the desired relative sizes to produce movement of a pitman arm 52 fixedly connected and movable with gear 51. The pitman arm has on the outer end thereof a cam roller 53 adapted to engage a substantially D-shaped cam track or guide 54 on the actuating cam 30, all of which is clearly shown in Figures 3 and 4 of the drawings.

In operation, gear 46 is keyed to the shaft 17 and hence rotates therewith. Gear 46 engages gear 47 freely and independently rotatable about the rephasing shaft 41. Gear 47 in turn engages gear 48 which is keyed to one end of a shaft 55 having gear element 49 keyed to the other end thereof. The shaft 55 is rotatably mounted to the outermost end of a rephasing arm 56 which has its inner end keyed as at 57 to the rephasing shaft 41 for movement therewith in the rephasing step hereinafter described. Rotary motion is transmitted through the shaft 55 to the gear element 49 in engagement with the gear element 50 also freely mounted on the rephasing shaft 41. The gear 50 rotates the gear 51 and hence moves the pitman arm 52 directly connected thereto so that the cam roller 53 will move to and fro in the cam guide 54 and thus slide the actuating cam 30 and the rack 27 connected thereto back and forth on the roller element 32 directly responsive to the amount of rotation of the sprocket 16 and main shaft 17 which initiates the movement of the gear train. The rack 27 in turn moves the potentiometers 13a, 13b and 13c, as above described to control the output of the pump unit.

Rephasing the actuating cam 30 is accomplished through the rephasing shaft 41 which is rotated by a rephasing motor 58 shown in Figure 4 and in the electrical circuit Figure 8 of the drawings. Thus, rephasing motor 58 is connected by a self-locking worm gear through connecting shafts 59 and 60 to a gear 61 disposed on the end of the shaft 60 in the housing 15. Gear 61 engages a gear 62 keyed to the rephasing shaft 41 and hence adapted to rotate the rephasing shaft 41 through an arc of movement depending upon the angular setting of the particular breaking switch on the breaking switch shaft 44 in the electrical circuit which starts or stops the rephasing motor 58.

Movement of the rephasing shaft 41 in turn moves the rephasing arm 56 in an equivalent arcuate path concentric to the rotation of the rephasing shaft 41, as is shown in Figures 3 and 4. The meshing gears 48 and 49 mounted through shaft 55 on the end of the rephasing arm, as is also indicated, are of different sizes. Hence, as the gears 48 and 49 are rotated with the arm 56, gear 47 is held substantially fixed or stationary while gear 50 will be rotated by differential action because the frictional torque of the gears 50, 51 and of the pitman arm 52 engaging the actuating cam is relatively small as compared to that of the buoyancy action of the float, the sprocket 16 and the gear 46 connected to the gear 47.

The rephasing motor 58 can, of course, rotate the rephasing shaft 41 in either direction. This will move the respective gearing, pitman arm and roller connected to the actuating cam 30 so that the said cam can move an equivalent amount to and fro in the horizontal plane to produce the desired movement of the rack and effect and control the respective outputs of the pump units as above described.

*Mechanism for starting and stopping the rephasing motor*

The amount of arcuate movement of the rephasing shaft 41 will depend on the action of the rephasing motor 58.

The rephasing motor action can be varied with the several units by the regulation of the angular position of the break switches 45 on the shaft 44 to which they are connected, in the manner well known in the art. In Figure 3 rephasing positions A, B, C, D, and E are shown each disposed at an equal interval although as stated they may be unequal if desired.

The starting mechanism of the rephasing motor 58 are the pump switches 40a, 40b, and 40c which act in both the forward direction to allow raising of the reference point of the fluid level of the suction reservoir and in the reverse direction to lower the reference point of the fluid level in the suction reservoir as will more clearly appear hereinafter when reference is made to correlate the electrical circuit with the combined speed control and rephasing mechanism.

The stopping mechanism for the rephasing motor 58 in the forward direction are the breaking switches 45a and 45b, and in the reverse direction breaking switches 45c and 45d.

The activating of the pump switches 40a, 40b and 40c is in turn a function of the cams 39a, 39b and 39c, as is hereinafter described.

Thus, the cam shaft 37 which receives action directly from float travel is connected through gear stepdown elements 63 and 64 to a rotatable shaft 65 which rotates cam switch arms 66a, 66b and 66c adapted to move the respective cams 39a, 39b and 39c through lost motion connections 67a, 67b and 67c. There will, of course, be one cam switch for each pump unit as indicated in the electrical circuit, three pump units A, B and C being shown. The cams 39a, 39b and 39c are also mounted on a rotatable setting shaft 68 and when rotated by action of the cam switch arms 66a, 66b and 66c will automatically actuate the respective pump switches 40a, 40b and 40c. While the cams 39a, 39b and 39c are shown as set at various angles indicated by the dotted lines in Figure 5, this is merely illustrative and can be altered and varied as the particular conditions for the pumping system require. The pump switches 40a, 40b and 40c may be any type of switch to coact with the cams 39a, 39b and 39c, as is shown in Figure 5 of the drawings, which type switches are well known in the art and hence require no further description herein.

The rotatable setting shaft 69 coacts with a worm gear 63 which acts as a friction device to hold the cam switches 39a, 39b and 39c at the angular positions of rotation until they are moved again responsive to the rise and fall of the float.

When a new unit is added or taken out of operation the fluid levels of the suction reservoir may momentarily draw down or increase, which would inadvertently reverse the movement of the main shaft 17 and hence the cam shaft 37 thereby shutting down or starting up the new unit once again.

In order to avoid this situation the lost motion or backlash connections 67a, 67b and 67c have been provided and they act to prevent on-off operation when a second unit is added or removed, and while rephasing is taking place.

Figures 5, 6 and 7 illustrate this lost motion operation for the cam switch 39a where the reference level is being raised. Thus in Figure 5 cam switch 39a is being moved by the cam switch arm 66a to actuate the pump switch 40a. In Figure 6, as further float action occurs the cam switch 39a is rotated till the pump switch 40a has made contact. The effect of this is to place another pump into operation and simultaneously therewith start the recycling of motor 58 as is hereinafter described. In the illustration for Figures 6 and 7 as the additional pump comes on the resulting speed will for this illustration cause overpumping and as a result the fluid level in the suction reservoir will recede. The effect of this is to cause the float to rotate the main shaft 17 as above described a short distance as a result of which the shaft 37 and hence the cam switch arm 66a connected thereto will move in a reverse direction. However, by reason of the lost motion connection 67a the arm can move without changing the cam switch 39a with respect to the position it had before. In the meantime the rephasing action will have continued as a result of which the flow control mechanism will have moved to give a lower speed position due to the downward float travel. At the lowest speed position the stabilization of inflow and outflow will occur and avoid temporarily stopping the second unit. The worm gear 68 will avoid having the cam flop back and forth during the period when the cam switch arm tends to reverse itself on slight movement or rotation as above described. It is only when the cam switch arm makes contact with the upper or lower portion of the lost motion connection that it will actually be able to rotate the respective cam switches 39a, 39b and 39c in one or the other direction.

*Operation*

Figure 9:
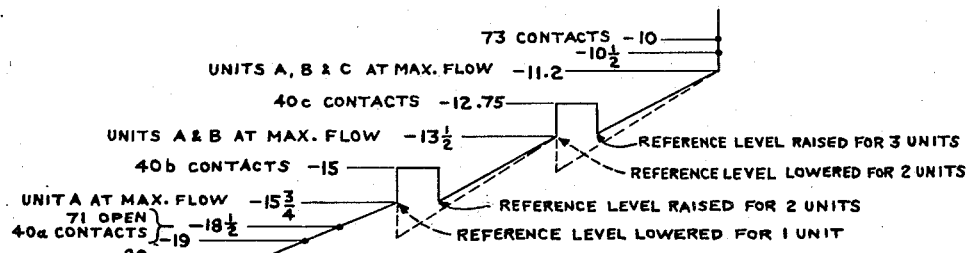
Figure 9 is a graphic illustration of the levels of the fluid in the suction reservoir to illustrate the effect of the rephasing of the actuating cam.

The operation of the float control and rephasing mechanism is best described by correlating the above described mechanical operation, with the electrical circuit shown in Figure 8 and the graphic illustration of a series of fluid levels for a fictitious suction reservoir shown in Figure 9, it being understood that the operation will be the same at other levels and in other suction reservoirs in the same type system.

Thus when the float is below levels −18½ the low water alarm 70 functions by means of its switch 71 which is disposed directly on the cam switch shaft 37 and hence responsive to the rise and fall of the float which moves the main shaft 17 keyed to shaft 37 as above described. The high water alarm 72 and its respective switch 73 operates similarly at the points above the −10 level.

As soon as the float level is at the suction reservoir level of −18½ the alarm switch 71 breaks, and cam switch 39a actuates the pump switch 40a, placing the pumping unit A into operation. This brings into the circuit the potentiometer rheostat 13a which is varied by the movement of the actuating cam 30 through movement of the float control mechanism as above described. This level will be the minimum speed operation or minimum output capacity for the pumping unit A and it is obvious that the pumping unit A may be varied to its maximum pumping speed or output capacity by variations in the fluid level of the suction reservoir. The maximum level at which the pumping unit A will be at its highest pumping speed is indicated at −15¾ for the present illustration.

If the suction reservoir level continues to rise above the fluid level of −15¾ the pumping unit A will continue at full speed and maximum flow but will not increase in speed, or output. The pitman arm in this position will have moved to the 64° angle so as to slide the actuating cam 30 and hence the rack 27 to the position as indicated by the phantomized view thereof in Figure 3. As inflow continues to increase over outflow, the level rises to −15 and the pitman arm will then be moved over into the constant radius sector of the cam groove 54 of the actuating cam 30 without increasing the speed of the pumping unit.

At the same time, however, cam switch 39b will actuate pump switch 40b which through the train of electrical action shown in Figure 8 will start pump B and the recycle motor, as hereinafter described.

The pump switch 40b simultaneously closes the circuit to the magnetic contactor 74b which controls the circuit to the prime mover for the pump unit B, and energizes the normally open relay 75b which in turn energizes a normally closed relay 76b and leads current through the breaking switch 45a which is closed to the rephasing motor 58 to start the motor. The breaking switch 45a is set at an angular adjustment to rephase the acuating cam 30 as above described whereby pump units A and B operate at 84% speed and comparable output capacity. This will cause the fluid level of the suction reservoir 3 to decrease until by the lowering of the float the actuating cam 30 will equate inflow and outflow and thus produce a new minimum speed level at about −16. The maximum speed level and output capacity for illustration is reached when units A and B are at the −13½.

If the suction reservoir 3 continues to rise above this level it will once again fail to increase the speed or output capacity of the two units. When the level −12.75 is reached then cam switch 39c actuates pump switch 40c.

Once again the pump switch simultaneously closes the circuit to the pump prime mover for unit C through the magnetic contactor 74c and energizes the normally open relay 75c, which in turn closes the circuit and energizes normally closed relay 76c and through breaking switch 45b the rephasing motor 58. The breaking switch 45b is set at an angular adjustment to rephase the actuating cam 30 as above described whereby pump units A, B and C operate at 85% speed and comparable output capacity. Once again, the fluid level in suction reservoir starts to drop until the lowering of the float causes the balancing of inflow and outflow in the suction reservoir. This once again is the new minimum speed reference level at approximately −13. The maximum speed level will be −11¼ for this illustration. Above −10 the switch 73 contacts and the high water alarm 72 lights up.

In the reverse direction as the pump units A, B and C reduce speed at −13¾, cam switch 39c opens pump switch 40c, which opens the circuit to relay 75c and hence the normally closed relay 76c. Since relay 76c when normally closed, completes the circuit to motor 58 through breaking switch 45c but in the reverse current flow direction the rephasing motor reverses itself, its arcuate movement being controlled by the angular setting of the breaking switch 45c as above described for switches 45a and 45b. The reverse rephasing causes the cam 30 to actuate the remaining units A and B to 100% speed and comparable output capacity. However, by reason of the overtravel on the reverse lowering, the two units have been overpumping the station, and hence even at 100% output there will be a lowering of the fluid level of the suction reservoir, for illustration, to approximately −13½. This is the new maximum speed level on the reverse direction.

The reducing fluid level repeats the rephasing cycle at −16.0 where cam switch 39b opens causing the pump switch 40b to stop the B pump unit, and to allow the normally closed relay 76b to actuate the rephasing motor 58 for reverse rephasing through the breaking switch 45d.

Pump unit A is caused to speed up by the rephasing action, and the new maximum speed level is approximately −15.75. The minimum speed level will be −19 at which point cam switch 39a causes the pump switch 40a to stop pump unit A and the low water switch 72 contacts and puts on the low water alarm 71.

If the fluid level of the suction reservoir 3 is high and it is desirable to lower the same as, for example, to prepare the station for a heavy load or to drain the inflow pipe, manual switches 78a, 78b and 78c are provided, along with manual potentiometers 79a, 79b and 79c, the changeover from automatic to manual being effected through double throw switches 80a, 80b and 80c.

Switches 81a, 81b and 81c are provided for switching the order of operation of the units. The circuit also shows time delay units 82a, 82b and 82c to allow the motors on the units to synchronize.

The pumping units marked X is intended to represent a constant speed unit which can be combined with the variable units above described without departing from the spirit of the invention. It may be automatically operated by cam action activating pumping switch 83 or manually through switch 84.

It will be understood that the invention is not to be limited to the specific construction or arrangement of parts shown, but that they may be widely modified within the invention defined by the claims.

What is claimed is:

1. In a flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output flow capacity thereof, of means for controlling the operation of said varying means including, an actuating cam, means responsive to the level in said suction reservoir for moving said cam to signal said varying means to vary the output of said pumps responsive to the rise and fall of the fluid level in said suction reservoir at a predetermined reference level of fluid in said reservoir, and mechanical actuating means connected to and coacting with said cam for repositioning said cam to alter the reference level of the fluid in said suction reservoir.

2. In a flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output flow capacity thereof, of means for controlling the operation of said varying means including, variable resistant means operatively connected to said varying means, means for changing the setting of said variable resistance means, an actuating cam, said setting means connected to and movable with said actuating cam, means for moving said cam to vary the setting means responsive to the rise and fall of the fluid level in said suction reservoir at a predetermined reference level, and automatically operated mechanical actuating means connected to and coacting with said cam for repositioning said cam and said setting means movable therewith whereby the reference level of the fluid in said suction reservoir is allowed to attain a new predetermined position.

3. In a flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output flow capacity thereof, of means for controlling the operation of said varying means including, variable resistance means operatively connected to said varying means, means for changing the setting of said variable resistance means, an actuating cam, said setting means connected to and movable with said actuating cam, means moving said cam to vary the setting means responsive to the rise and fall of the fluid level in said suction reservoir at a predetermined reference point, said means responsive to the level of fluid in said suction reservoir having automatic means thereon for starting and stopping said pumps with variations in the rise and fall of the fluid level in said suction reservoir, and automatically operated mechanical actuating means connected to and coacting with said cam for repositioning said cam and said setting means movable therewith whereby the reference level of the fluid in said suction reservoir is allowed to attain a new predetermined position.

4. In a flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output flow capacity thereof, of means for controlling the operation of said varying means including, variable resistance means operatively connected to said varying means, means for changing the setting of said variable resistance means, an actuating cam, said setting means connected to and movable with said actuating cam, means moving said cam to vary the setting means responsive to the rise and fall of the fluid level in said suction reservoir at a predetermined reference point, said means responsive to the level of fluid in said suction reservoir having automatic means thereon for starting and stopping said pumps with variations in the rise and fall of the fluid level in said suction reservoir, and automatically operated mechanical actuating means connected to and coacting with said cam for repositioning said cam and said setting means movable therewith whereby the reference level of the fluid in said suction reservoir is allowed to attain a new predetermined position, and said mechanical actuating means for repositioning said cam actuated simultaneously with the starting and stopping of said pumps.

5. In a flow control and rephasing mechanism as claimed in claim 4 wherein said actuating cam has a constant speed sector and a varying speed sector whereby during predetermined periods of actuation of said cam along the varying speed sector it will signal variations and outflow capacity of said pumps from minimum to maximum, and said constant speed sector to allow for overtravel of said means for actuating said cam without affecting output capacity of the pumps in operation.

6. In a flow control and rephasing mechanism as claimed in claim 4 wherein said means for rephasing said cam includes, a rotatable shaft, a rephasing motor for rotating said shaft, a gear train mounted on said rotatable shaft for moving said cam to regulate the output of the pumps to allow alteration of said reference level, and means on said rotatable shaft to stop said rephasing motor after a predetermined interval of movement of said rotatable shaft.

7. In a flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output flow capactiy thereof, of means for controlling the operation of said varying means including, variable resistance means operatively connected to said varying means, means for changing the setting of said variable resistance means, an actuating cam, said setting means connected to and movable with said actuating cam, means moving said cam to vary the setting means responsive to the rise and fall of the fluid level in said suction reservoir at a predetermined reference point, said means responsive to the level of fluid in said suction reservoir having automatic means thereon for starting and stopping said pumps with variations in the rise and fall of the fluid level in said suction reservoir, and automatically operated mechanical actuating means connected to and coacting with said cam for rephasing the cam and the setting means movable therewith whereby the reference level of the fluid in said suction reservoir is allowed to attain a new predetermined position, said means for rephasing said cam actuated simultaneously with the starting and stopping of said pumps, and means on said mechanical actuating means to stop the operation thereof after a predetermined interval of movement of said cam.

8. In a flow control and rephasing mechanism as claimed in claim 7 wherein said starting and stopping means for said pumps includes breaking switches, an overriding means on each of said breaking switches to prevent starting and stopping of said pumps with temporary variations of the fluid in said suction reservoir during the time that the cam is being rephased.

9. In a flow control and rephasing mechanism for pumping systems having a suction reservoir the combination with a plurality of pumps having their suction connected to said suction reservoir, a constant speed driving means for each of said pumps, and means connecting each of said driving means to its corresponding pump adapted to vary the output flow capacity thereof, of means for controlling the operation of said varying means including, potentiometer rheostats for each pump connected to said varying means, means for changing the setting of said rheostats, an actuating cam, said setting means connected to and movable with said actuating cam, a rotatable shaft having said cam disposed slidably thereon, cam switches connected to said rotatable shaft for actuating said pumps into operation, means to rotate said rotatable shaft and for varying said cam responsive to the rise and fall of the fluid level in said suction reservoir at a predetermined reference level of the fluid therein, said cam switches having over-riding means therein including, a lost motion slot, a pivotal arm for moving said cam switches having one end adapted for engagement with said lost motion slot, and the other end thereof adapted to be rotated by said rotatable shaft, and means for rephasing said cam actuated simultaneously with the actuation of said pumps and stopped after a predetermined interval of movement to vary the reference level of the fluid in said suction reservoir.

10. In a flow control and rephasing mechanism as claimed in claim 9 wherein said means for moving said cam includes a rephasing shaft rotatably mounted in spaced relation to said rotatable shaft, a fixed and a freely movable gear mounted on said rotatable shaft, and a gear train mounted on said rephasing shaft connecting said fixed and said freely rotatable gear on the rotatable shaft.

11. In a flow control and rephasing mechanism as claimed in claim 9 wherein said means for moving said cam includes, a rephasing shaft rotatably mounted in spaced relation to said rotatable shaft, a fixed and a freely rotatable gear on said rotatable shaft, and the gear train mounted on said rephasing shaft connecting said fixed and said freely rotatable gear on the rotatable shaft, and said means for rephasing said cam is connected to alter the operation of said gear train by differential action.

12. In a flow control and rephasing mechanism as claimed in claim 9 wherein said means for moving said cam includes, a gear train, and said means for rephasing said cam is connected to said gear train to alter the operation thereof by differential action.

13. In a flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output flow capacity thereof, of means for controlling the operation of said varying means including, potentiometer rheostats for each pump connected to said varying means, means for changing the setting of said rheostats, an actuating cam, said setting means connected to and movable with said actuating cam, a rotatable shaft having said cam disposed slidably thereon, cam switches connected to said rotatable shaft for actuating said pumps into operation responsive to the rise and fall of the fluid level in said suction reservoir, means to rotate said rotatable shaft and for varying said cam responsive to the rise and fall of the fluid level in said suction reservoir at a predetermined reference level, said means for moving said cam including a rephasing shaft, a fixed and a freely rotatable gear on said rotatable shaft, and a gear train mounted on said rephasing shaft connecting said fixed and said freely rotatable gear for movement thereof, a rephasing motor, gearing connecting said rephasing motor to said rephasing shaft for rotating the same through an interval determined by the angular setting of said cam switches and said breaking switches, and an arm movable with said rephasing shaft to alter said gear train by differential action.

14. In an automatic flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output capacity thereof, of means for controlling the operation of said varying means including, an electronic controller operatively connected to said varying means, a housing, a potentiometer rheostat for each of said pumps mounted in said housing adapted to signal said electronic controller, means for changing the setting of said rheostats, an actuating cam, said setting means connected to and movable with said actuating cam, a main shaft mounted in said housing and having said actuating cam slidably disposed thereon, a flow control responsive to the level of fluid in said suction reservoir to rotate said main shaft, a rephasing shaft in said housing in spaced relation to said main shaft, a gear train including a fixed gear and a freely rotatable gear on said main shaft, and lever means connected to said gear train to actuate said cam, angularly disposed cam switches connected to said main shaft and operatively moved thereby to start and stop said pumps in predetermined order responsive to the rise and fall of fluid signalled to said main shaft, and rephasing means for said actuating cam connected to said gear train and actuated simultaneously with the starting and stopping of said pumps to alter the reference level of said suction reservoir.

15. In an automatic flow control and rephasing mechanism as claimed in claim 14 wherein said rephasing means includes, a rephasing motor operatively connected to said rephasing shaft, and means on said rephasing shaft including an arm movable therewith to adjust and move said cam by differential action through said gear train.

16. In an automatic flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output capacity thereof, of means for controlling the operation of said varying means including, an electronic controller operatively connected to said varying means, a housing, a potentiometer rheostat for each of said pumps mounted in said housing adapted to signal said electronic controller, means for changing the setting of said rheostats, an actuating cam, said setting means connected to and movable with said actuating cam, a main shaft mounted in said housing and having said actuating cam slidably disposed thereon, a flow control responsive to the level of fluid in said suction reservoir to rotate said main shaft, a rephasing shaft in said housing in spaced relation to said main shaft, an arm fixedly mounted and movable with said rephasing shaft, a gear train including a fixed and a freely rotatable gear mounted on said main shaft, gears of different ratio in said gear train rotatable on a shaft mounted on said arm, said freely rotatable gear having lever means for actuating said cam, angularly disposed cam switches on said main shaft to start and stop said pumps in predetermined order responsive to the rise and fall of fluid signalled to said main shaft, and rephasing means for said actuating cam connected to said rephasing shaft and actuated simultaneously with the stopping and starting of said pumps to alter the reference level of said suction reservoir.

17. In an automatic flow control and rephasing mechanism for pumping systems having a suction reservoir the combination with a plurality of pumps having their suction inlets connected to said suction reservoir, a constant speed driving means for each of said pumps, and means connecting each of said driving means to its corresponding pump adapted to vary the output capacity thereof, of means for controlling the operation of said varying means including, an electronic controller operatively connected to said varying means, a housing, a potentiometer rheostat for each of said pumps mounted in said housing adapted to signal said electronic controller, means for changing the setting of said rheostats, an actuating cam, said setting means connected to and movable with said actuating cam, a main shaft mounted in said housing and having said actuating cam slidably disposed thereon, a flow control responsive to the level of fluid in said suction reservoir to rotate said main shaft, a rephasing shaft in said housing in spaced relation to said main shaft, an arm fixedly mounted and movable with said rephasing shaft, a gear train including a fixed and a freely rotatable gear mounted on said main shaft, gears of different ratio in said gear train rotatable on a shaft mounted on said arm, said freely rotatable gear having lever means for actuating said cam, angularly disposed cam switches on said main shaft to start and stop said pumps in predetermined order responsive to the rise and fall of fluid signalled to said main shaft, and a rephasing motor connected to said rephasing shaft actuated simultaneously with the starting and stopping of said pumps, breaking switches connected to said rephasing shaft to regulate the movement of said rephasing shaft over a predetermined interval, said arm and gear train so constructed and arranged so as to re-position said cam by differential action to alter the reference level of the fluid in said suction reservoir.

18. In a flow control and rephasing mechanism for pumping systems having a suction reservoir the combination with a plurality of pumps having their suction inlets connected to said suction reservoir, a constant speed driving means for each of said pumps and means connecting each of said driving means to its corresponding pump adapted to vary the output flow capacity thereof, of means for controlling the operation of said varying means including potentiometer rheostats for each pump connected to said varying means, means for changing the setting of said rheostats, an actuating cam, said setting means connected to and movable with said actuating cam, a rotatable shaft having said cam disposed slidably thereon, cam switches connected to said rotatable shaft for actuating said pumps into operation, means to rotate said rotatable shaft and for varying said cam responsive to the rise and fall of the fluid level in said suction reservoir at a predetermined reference level of fluid in said suction reservoir, automatically operated mechanical actuating means connected to and coacting with said cam for repositioning the cam and the setting means movable therewith on said rotatable shaft and to allow the reference level of the fluid in said suction reservoir to attain a new predetermined position, switch means on said rotatable shaft for stopping and starting said pumps, and breaking switches on said rotatable shaft to act simultaneously with said switch means for actuating the mechanical actuating means through a predetermined interval of movement.

19. In a flow control and rephasing mechanism as claimed in claim 18, wherein said breaking switches include over-riding means therein to prevent starting and stopping of pump units due to temporary variations in the level of the fluid in the suction reservoir during the rephasing of the cam.

References Cited in the file of this patent
UNITED STATES PATENTS

| | | |
|---|---|---|
| 1,003,757 | Kinney | Sept. 19, 1911 |
| 1,444,914 | Harvey | Feb. 13, 1923 |
| 1,977,737 | Needham | Oct. 23, 1934 |
| 2,733,660 | Towle et al. | Feb. 7, 1956 |